United States Patent
Grois et al.

(10) Patent No.: US 12,155,712 B2
(45) Date of Patent: *Nov. 26, 2024

(54) METHODS, SYSTEMS, AND APPARATUSES FOR ADAPTIVE BITRATE LADDER CONSTRUCTION BASED ON DYNAMICALLY ADJUSTABLE NEURAL NETWORKS

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,372

(22) Filed: Jun. 29, 2023

(65) Prior Publication Data
US 2023/0344889 A1    Oct. 26, 2023

Related U.S. Application Data

(63) Continuation of application No. 17/478,515, filed on Sep. 17, 2021, now Pat. No. 11,743,313.

(51) Int. Cl.
*G06F 13/00* (2006.01)
*G06N 3/045* (2023.01)
(Continued)

(52) U.S. Cl.
CPC ............ *H04L 65/70* (2022.05); *G06N 3/045* (2023.01); *H04L 65/75* (2022.05); *H04L 65/80* (2013.01)

(58) Field of Classification Search
CPC ......... H04L 65/70; H04L 65/75; H04L 65/80; H04L 65/611; G06N 3/045; G06N 3/082;
(Continued)

(56) References Cited

U.S. PATENT DOCUMENTS

| 6,411,946 B1 | 6/2002 | Chaudhuri |
| 11,743,313 B2 * | 8/2023 | Grois ................. H04N 21/2662 709/231 |

(Continued)

FOREIGN PATENT DOCUMENTS

WO    2016/160295 A1    10/2016

OTHER PUBLICATIONS

Deep Learning Neural Networks Explained in Plain English; Nick McCullum; Jun. 2020 (Year: 2020).
Hongzi Mao et al: "Neural adaptive video streaming with pensieve." Proceedings of the conference of the ACM special interest group on data communication, pp. 197-210, 2017.
(Continued)

*Primary Examiner* — Kenneth R Coulter
(74) *Attorney, Agent, or Firm* — BakerHostetler

(57) ABSTRACT

Methods, systems, and apparatuses are described for streaming content. The embodiments described herein may apply to ABR streaming and output an optimized ABR ladder enabling a playback device to maximize the perceived video quality of received content, provide substantially constant visual quality, and/or minimize rebuffering content. The playback device may request an ABR representation associated with an ABR ladder that has been optimized based on one or more neural networks. The one or more neural networks may be pre-trained based on one or more properties and characteristics/features of the video content. The one or more neural networks may process the video content to dynamically determine parameters such as the bitrates of each ABR representation for the content. The parameters may be used to output the encoded ABR representations.

36 Claims, 6 Drawing Sheets

(51) Int. Cl.
*H04L 65/70* (2022.01)
*H04L 65/75* (2022.01)
*H04L 65/80* (2022.01)

(58) Field of Classification Search
CPC ............... G06N 3/0985; H04N 19/154; H04N 21/23439; H04N 21/2402; H04N 21/2662; H04N 21/8456; H04N 21/2385
USPC ....... 709/231, 224, 220–222, 201, 249, 250; 706/2, 6, 14, 15, 16, 21
See application file for complete search history.

(56) References Cited

U.S. PATENT DOCUMENTS

| | | |
|---|---|---|
| 2020/0099733 A1 | 3/2020 | Chu et al. |
| 2020/0162535 A1 | 5/2020 | Ma et al. |
| 2021/0279222 A1 | 9/2021 | Peng |
| 2021/0360260 A1 | 11/2021 | Rehman et al. |
| 2021/0409789 A1 | 12/2021 | Han et al. |

OTHER PUBLICATIONS

Huang Tianchi et al: "Deep reinforced bitrate ladders for adaptive video streaming", Proceedings of the 30th ACM International Conference on Information & Knowledge Management, Jul. 16, 2021; Dec. 2, 2021-Dec. 3, 2021 ACMPUB27, New York, NY, USA, (Jul. 16, 2021) pp. 66-73.

Huang, Tianchi, et al. "QARC: Video quality aware rate control for real-time video streaming based on deep reinforcement learning." Proceedings of the 26th ACM international conference on Multimedia. 2018.

Neural Adaptive Video Streaming with Pensieve; Mao et al.; SIGCOMM '17; Aug. 2017 (Year: 2017).

Steward: Smart Edge based Joint QoE Optimization for Adaptive Video Streaming; Ma et al.; NOSSDAV '19; Jun. 2019 (Year: 2019).

US Patent Application filed Sep. 17, 2021, entitled "Methods, Systems, and Apparatuses for Adaptive Bitrate Ladder Construction Based on Dynamically Adjustable Neural Networks", U.S. Appl. No. 17/478,515.

\* cited by examiner

METHODS, SYSTEMS, AND APPARATUSES FOR ADAPTIVE BITRATE LADDER CONSTRUCTION BASED ON DYNAMICALLY ADJUSTABLE NEURAL NETWORKS

CROSS REFERENCE TO RELATED APPLICATION

This application is a continuation of U.S. patent application Ser. No. 17/478,515, filed Sep. 17, 2021, now U.S. Pat. No. 11,743,313, which is hereby incorporated by reference in its entirety.

BACKGROUND

Adaptive bitrate (ABR) streaming has emerged as a mainstream method for video distribution over non-provisioned networks that support Over-the-Top (OTT) media services as well as for multiple traditional cable, IPTV, and broadcast providers. Traditional video content delivery methods are "pushing" video content to "dumb" near-identical clients. This approach does not scale well due to unpredictable network conditions and a broad range of devices having different decryption, decoding, and rendering capabilities. HTTP Live Streaming (HLS) and MPEG Dynamic Adaptive Streaming over HTTP (DASH) technologies are responsible for many adaptive streaming deployments. ABR streaming schemes operate based on "pulling" (i.e., explicitly requesting) the content, thereby allowing an intelligent end client to make decisions based on the knowledge of its capabilities and conditions. In adaptive streaming, the same content is encoded in multiple representations. However, encoding multiple representations is computationally complex and resource-intensive. Accordingly, there is a need for improved techniques for ABR streaming.

SUMMARY

This Summary is provided to introduce concepts that are further described herein. This Summary is not intended to be used to limit the scope of the claimed subject matter.

Methods, systems, and apparatuses are described for streaming content. The embodiments described herein may apply to ABR streaming and output an optimized ABR ladder enabling a playback device to maximize the perceived video quality of received content, provide substantially constant visual quality, and/or minimize rebuffering content. The playback device may request an ABR representation associated with an ABR ladder that has been optimized based on one or more neural networks. The one or more neural networks may be pre-trained based on one or more properties and characteristics/features of the video content. The one or more neural networks may process the video content (e.g., sport, drama, comedy, news, etc.), the network conditions at any given moment (e.g., available bandwidth, QoS, latency, packet loss ratio, rebuffering time, or QoE), or the cost of the local and/or cloud-based storage to dynamically determine parameters such as the bitrates of each ABR representation for the content. The parameters may be used to output the encoded ABR representations.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
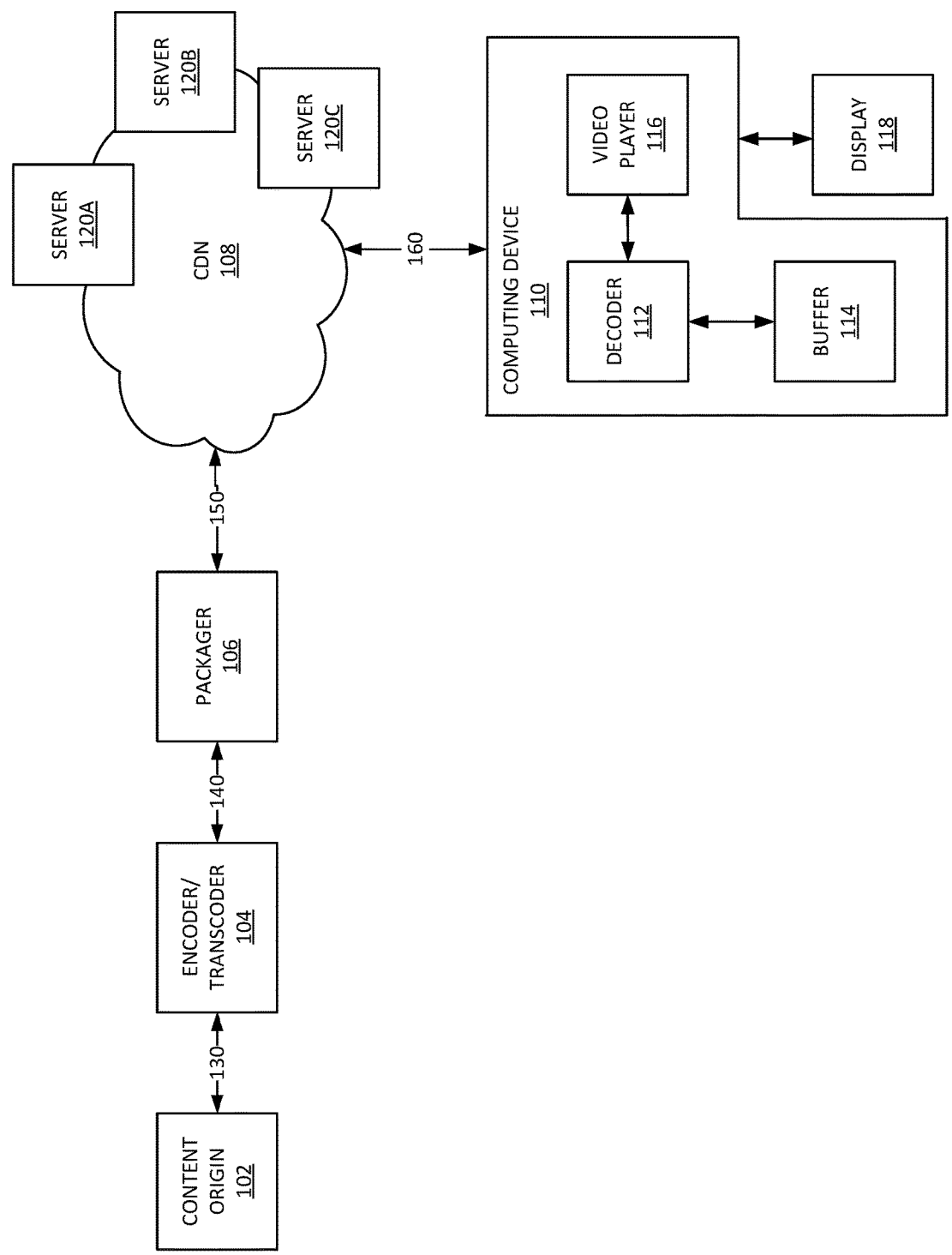
FIG. 1 shows an example system.

Methods and systems are described for content streaming. In accordance with the embodiments described herein, a bitrate ladder used for ABR streaming may be adaptively constructed and optimized based on parameters determine by one or more neural networks. Adaptive streaming has emerged as a mainstream method for video distribution over non-provisioned networks that support Over-the-Top (OTT) media services as well as for multiple traditional cable, IPTV, and broadcast providers. Traditional video content delivery methods are "pushing" video content to "dumb" near-identical clients. This approach does not scale well due to unpredictable network conditions and a broad range of devices having different decryption, decoding, and rendering capabilities.

HTTP Live Streaming (HLS) and MPEG Dynamic Adaptive Streaming over HTTP (DASH) technologies are responsible for many adaptive streaming deployments. Adaptive bitrate streaming schemes operate based on "pulling" (i.e., explicitly requesting) the content, thereby allowing an intelligent end client to make decisions based on the knowledge of its capabilities and conditions. In adaptive streaming, the same content is encoded in multiple representations. In case of video content, these representations vary by characteristics, such as bitrates, resolutions, and frame rates, etc. Generally, the encoded content is broken into segments, which are individually addressable and independently playable short chunks of media. As a result, ABR is a key enabler for large-scale video distribution over internet.

While ABR streaming enables very reliable and robust video distribution, it comes at a cost. While only a single SD and a single HD representation is needed for traditional cable/IPTV distribution, ABR requires far more representations. This, in turn, takes a heavy toll on computational resources because an asset distributed using ABR streaming needs to be encoded multiple times at different bitrates and resolutions. The end result is a very time-consuming and resource-intensive process, especially for UltraHD content. The main reason for that is because from the video encoding standpoint, not much has changed from the traditional landscape beyond the sheer volume of encodes—instead of providing two versions of the same content (i.e., a single SD and a single HD representation), there is a much larger set of representations at different bitrates. This set of bitrates is typically called bitrate ladder, where each "step" corresponds to a single representation. Generally, the way of operation is as follows: first, the streaming client retrieves a manifest, which describes representations available to it, and then selects a representation best-suited for its current network conditions and device capabilities. After that, the streaming client downloads segments from the selected representation and constantly re-evaluates its selection of a representation, given the current network conditions and the state of its playback buffer. For example, in case the streaming client decides to shift to a different representation after downloading segment i from representation A, it will download and play segment i+1 from representation B. This is referred to as bitrate switching, and the process of using bitrate switching to adapt to current network conditions is referred to as rate adaptation.

However, the construction of an efficient bitrate ladder is a very time-consuming and resource-intensive process, especially for UltraHD content. Moreover, a "bad" or "non-optimized" bitrate ladder leads to inefficient deployment of computational/network resources, inefficient usage of available network bandwidth, and of course waste of the quite expensive local or cloud-based storage space.

Recently, there have been a dramatic progress in the artificial intelligence/neural networks field, and particularly in the field of machine learning, deep learning, reinforcement learning, generative adversarial networks (GANs) or graph neural networks (GNNs). One of the reasons for that is an availability of powerful processing resources, such as Graphics Processing Units (GPUs). Moreover, during the last years, the GPU costs are constantly decreasing, and nowadays almost any widely-spread consumer device (such as smartphone, tablet, laptop) incorporates at least one GPU for significantly enhancing its processing power.

The embodiments described herein enable construction of an efficient and optimized bitrate ladder, to address the ever-growing demand for higher-resolution and higher-framerate video content, such as HD and UltraHD—4K and 8K (i.e., 3840×2160 or 7680×4320 resolutions in terms of luma samples, respectively), which requires higher bitrates. The embodiments described herein may output an ABR ladder that is adaptively constructed and/or optimized either in real-time or offline using one or more neural networks. The one or more neural networks may be pre-trained based on one or more properties and characteristics/features of the video content. The one or more neural networks may process the video content (e.g., sport, drama, comedy, news, etc.), the network conditions at any given moment (e.g., available bandwidth, QoS, latency, packet loss ratio, rebuffering time, or QoE); or the cost of the local and/or cloud-based storage to dynamically determine parameters such as the bitrates of each ABR ladder representation for the video content. The encoding parameters sent to an encoder may be used to provide an optimized ABR ladder for any requirement of the video player and/or the content origin. For example, the optimized ABR ladder may maximize the perceived video quality of each chuck/segment received from content origin, provide substantially constant visual quality, or eliminate/minimize a number of times when the video player's buffer is empty.

FIG. 1 shows an example system 100. The system 100 may comprise a content origin 102, encoder/transcoder 104, packager 106, a content delivery network (CDN) 108, and a computing device 110. The techniques for video processing described herein are applicable to any delivery method including but not limited to Dynamic Adaptive Streaming over HTTP (DASH), HTTP Live Streaming (HLS), the QAM digital television standard, and adaptive bitrate (ABR) streaming.

The computing device 110 may comprise a television, a monitor, a laptop, a desktop computer, a smartphone, a set-top box, a cable modem, a gateway, a tablet, a wearable computing device, a mobile computing device, any computing device configured to receive and/or render content, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video data. The encoded video data may be received from the encoder/transcoder 104, the packager 106, or the CDN 108.

The content origin 102 may comprise a source feed of content from a provider. For example, the content origin 102 may comprise a broadcast source, a headend, a video on-demand server, a cable modem termination system, the like, and/or any combination of the foregoing. The content origin 102 may send content 130 to the encoder/transcoder 104. The content 130 may comprise video frames or other images. For example, the content 130 may comprise video frames in a Moving Picture Experts Group (MPEG) Single Program Transport Stream (MPEG-SPTS). Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The content origin 102 may receive requests for the content 130 from the encoder/transcoder 104, the packager 106, the computing device 110, or the CDN 108.

The content origin 102 may send content 130 to the encoder/transcoder 104 based on a request for video from the encoder/transcoder 104, the packager 106, the computing device 110, or the CDN 108. The content 130 may comprise uncompressed video data or a content stream such as an MPEG-SPTS. The encoder/transcoder 104 may transcode the content 130 into one or more output streams 140. The one or more output streams 140 may comprise video encoded with a different resolution and/or a different bitrate. The one or more output streams 140 may comprise a presentation timestamp (PTS) to synchronize the content. The one or more output streams 140 may comprise one or more Instantaneous Decoder Refresh (IDR) frames.

The encoder/transcoder 104 may comprise an encoder, which may encode uncompressed video data received from the content origin 102. When uncompressed video data is received, the encoder may encode the video (e.g., into a compressed format) using a compression technique prior to transmission. The content origin 102 and the encoder/transcoder 104 may be co-located at a premises, located at separate premises, or associated with separate instances in the cloud.

The packager 106 may receive the one or more output streams 140 from the encoder/transcoder 104. The packager 106 may generate one or more ABR streams 150 in different ABR streaming formats. The one or more ABR streams 150 may be referred to as an ABR ladder, which comprises a list of the encoded one or more ABR streams 150 at the different bitrates enabling the computing device 110 to play video to match the network conditions (e.g., available bandwidth, quality of service (QoS), latency, packet loss ratio, rebuffering time, or quality of experience (QoE)).

The one or more ABR streams 150 may comprise segments or fragments of video and a manifest. The manifest may indicate availability of the ABR stream and segments/fragments and information for requesting the segments/ fragments (e.g., via a Uniform Resource Locator (URL)). The packager 106 may send the one or more ABR streams 150 to the CDN 108.

The CDN 108 may comprise one or more computing devices such as servers 120A, 120B, 120C that store the one or more ABR streams 150. The CDN 108 may receive a request for content from the computing device 110. The request may be sent via a transfer protocol such as a transfer protocol used for over-the-top (OTT) playout applications. For example, this protocol may be HTTP as used in the examples described herein. However, any other transfer protocol may be used. The CDN 108 may authorize/authenticate the request and/or the computing device 110 from which the request originated. The request for content may comprise a request for a channel, a video on-demand asset, a website address, a video asset associated with a streaming service, the like, and/or any combination of the foregoing. The CDN 108 may send the request to the content origin 102, the encoder/transcoder 104, or the packager 106. The CDN 108 may send the requested content 160 to the computing device 110. The one or more servers 120A, 120B, 120C of the CDN 108 may serve the content 160 to the computing device 110.

Figure 2:
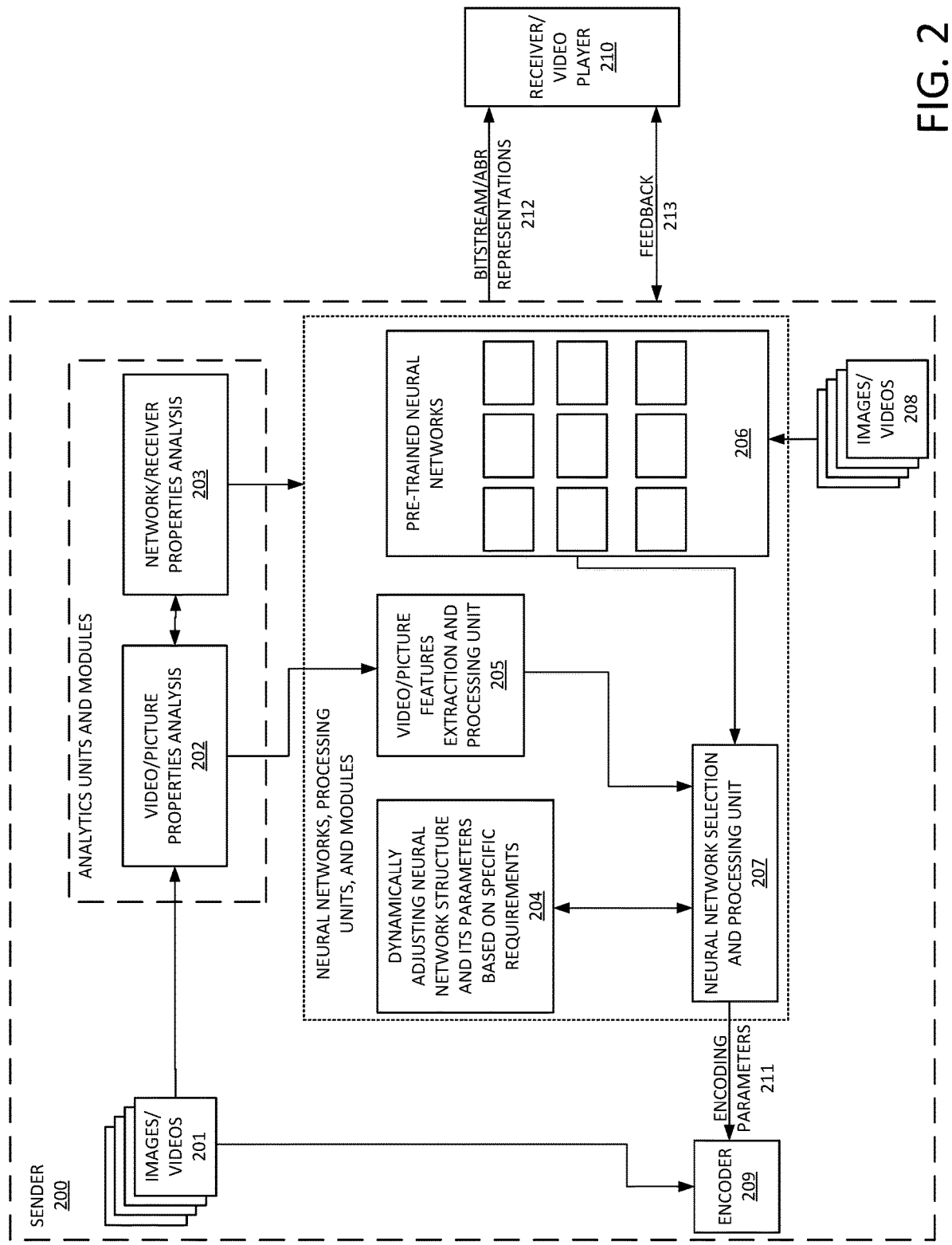
FIG. 2 shows an example system.

FIG. 2 shows an example system at a sender 200. The sender system 200 may comprise any number of computing devices or servers. The sender system 200 may output an ABR ladder that is adaptively constructed and/or optimized either in real-time or offline using one or more machine learning algorithms. The one or more machine learning algorithms may comprise autoregression, classification, supervised/unsupervised learning, support vector machines (SVMs), random forest, or neural networks. The neural networks may comprise one or more of deep neural networks (DNNs), reinforcement neural networks (where two agents compete each other for achieving a better solution), convolutional neural networks (CNNs), graph neural networks (GNNs), etc. Each ABR ladder representation of the ABR ladder may be optimized using one or more neural networks. The one or more neural networks may be trained based on one or more video stream properties and characteristics/features. The one or more video stream properties and characteristics/features may comprise resolution (e.g., 720p, 1080p, 2160p); frame rate (e.g., 24 fps, 50 fps, 60 fps, 120 fps; or the objective or subjective visual quality in terms of peak signal-to-noise ratio (PSNR), structural similarity index measure (MS-SSIM), multiscale SSIM (MS-SSIM), or video multimethod assessment fusion (VMAF). The one or more neural networks may consider specific video content (e.g., sport, drama, comedy, news, etc.), the network conditions at any given moment (e.g., available bandwidth, QoS, latency, packet loss ratio, rebuffering time, or QoE); or the cost of the local and/or cloud-based storage.

The video/picture properties analysis unit 202 may receive input content such as one or more input images/videos 201. The input images/videos 201 may comprise, for example, High Dynamic Range (HDR) content and/or Standard Dynamic Range (SDR) content. The demand to preserve fine details and colors is higher in HDR content. The video/picture properties analysis unit 202 may analyze each frame (or any its portion) of an input video 201 to determine various video properties. The properties may comprise video content type, objective/subjective quality, resolution, frame rate, etc. The network/receiver properties analysis unit 203 may provide information associated with the receiver/video player 210 and/or the network within which the receiver/video player 210 is communicating. The information may comprise available bandwidth, QoS, response time/latency, packet loss ratio, rebuffering state/time, QoE, etc.

The video/picture features extraction and processing unit 205 may comprise a plurality of neural network layers, such as convolutional neural network (CNN) layers, for extracting features from each frame or any part of it. The extracted features may comprise one or more of: temporal and spatial information, edges, corners, textures, pixel luma and chroma values, region of interests, motion/optical flow information, backgrounds, foregrounds, patterns, spatial low/high frequencies, among others. In addition, the video/picture features extraction and processing unit 205 may process features which have been already determined by the video/picture properties analysis unit 202.

The sender system 200 may comprise a plurality of neural networks 206 that pre-trained based on each of the above-mentioned video/picture/network/receiver features and characteristics. For example, the plurality of neural networks 206 may be pre-trained based on images/videos 208. The plurality of pre-trained neural networks 206 may comprise one or more of the following types of neural networks and any combination thereof: generative adversarial networks, reinforcement learning, deep neural networks, convolutional neural networks, graph neural networks, etc. as well as machine learning solutions, such as support vector machines, random forest, etc. Parameters such as the bitrates or any other parameters of each ABR ladder representation may be dynamically determined based on communication network conditions at any given moment in time (e.g., every 1-10 seconds). Future bitrates may be selected substantially in real-time based on at least one already encoded frame or any portion of it. A neural network of the plurality of pre-trained neural networks 206 may be selected to achieving different goals. For example, different neural networks may be selected such as a reinforcement learning based neural network for maximizing QoE, a CNN for maximizing the perceptual visual quality and/or maintaining the quality substantially at a constant level, a generative adversarial network may be selected for reducing response time/latency and/or reducing rebuffering time, etc. In addition, each neural network structure and its parameters may be dynamically adjusted for each specific task. Thereby, the inference stage may be conducted in a dynamic manner. For example, a number of hidden layers, a number of neural network parameters, specific neural network models, neural network loss functions, neural network activation functions, etc. may be dynamically adjusted for achieving an optimal performance as a trade-off of accuracy and computational complexity in terms of processing time for performing a given task/goal.

The neural network processing and selection unit 207 may receive data from the video/picture features extraction and processing unit 205 and/or the network/receiver properties analysis unit 203. The neural network processing and selection unit 207 may perform the selection of one or more neural networks, from the plurality of pre-trained neural networks 206, that is the most appropriate for accomplishing a specific (customizable) task/goal. The task/goal to accomplish may comprise, for example, maintaining the visual presentation quality at a constant level based on the type of content (e.g., sport, news, etc.), the given video characteristics (resolution, frame rate, etc.), and/or the given network conditions (available bandwidth, response time/latency, rebuffering state, etc.). The neural network may be selected/reselected for every chunk/segment of each video stream representation for determining optimal encoding parameters at any given moment, including bitrates, QP values, resolutions, frame rates, etc. The structure and parameters of the selected one or more neural networks may be dynamically adjusted for achieving an optimal performance as a trade-off of accuracy and computational complexity in terms of processing time for performing the given task/goal.

The neural network processing and selection unit 207 may send encoding parameters to the encoder 209. The encoder 209 may comprise any type of encoder including but not limited to: H.264/MPEG-AVC, H.265/MPEG-HEVC, MPEG-5 EVC, H.266/MPEG-VVC, AV1, VP9, etc. The encoding parameters 211 sent to the encoder 209 may be based on the received data from the video/picture features extraction and processing unit 205, and/or the network/receiver properties analysis unit 203, and based on the one or more parameters for encoding a plurality of ABR representations of the content determined by the selected one or more neural networks.

The encoding parameters sent to the encoder 209 and the input images/videos 201 may be used to provide an optimized bitstream comprising one or more ABR representations 212 (e.g., an ABR ladder) for any requirement of the receiver/video player 210 and/or the content origin. For example, the optimized ABR ladder may maximize the desired QoE as perceived by the user of the receiver/video player 210 based on one or more predefined criteria. The one or more predefined criteria may comprise one or more of: maximizing perceived video quality of each chuck/segment received from content origin; providing substantially constant visual quality (e.g., without significant quality fluctuations; or eliminating or at least minimizing a number of times when the client's buffer is empty (e.g., due to relatively low network bandwidth), thereby eliminating or reducing possible rebuffering events at the client/user end.

The optimized bitstream comprising one or more ABR representations 212 may maintain the desired substantially constant visual presentation quality, as determined by (objective/subjective) quality metrics, including but not limited to PSNR, MS-SSIM, VMAF, etc. The optimized bitstream comprising one or more ABR representations 212 may be determined and maintained for the optimal perceptual visual quality, as perceived substantially in real-time by the user of the receiver/video player 210. The optimized bitstream comprising one or more ABR representations 212 may eliminate, or at least minimize, a response time/latency along with the video playback rebuffering at the clients'/users' end. Real-time feedback 213 may be provided to the sender system 200. The real-time feedback 213 may be indicative of the perceptual visual quality, as perceived substantially in real-time by the user of the receiver/video player 210.

Figure 3:
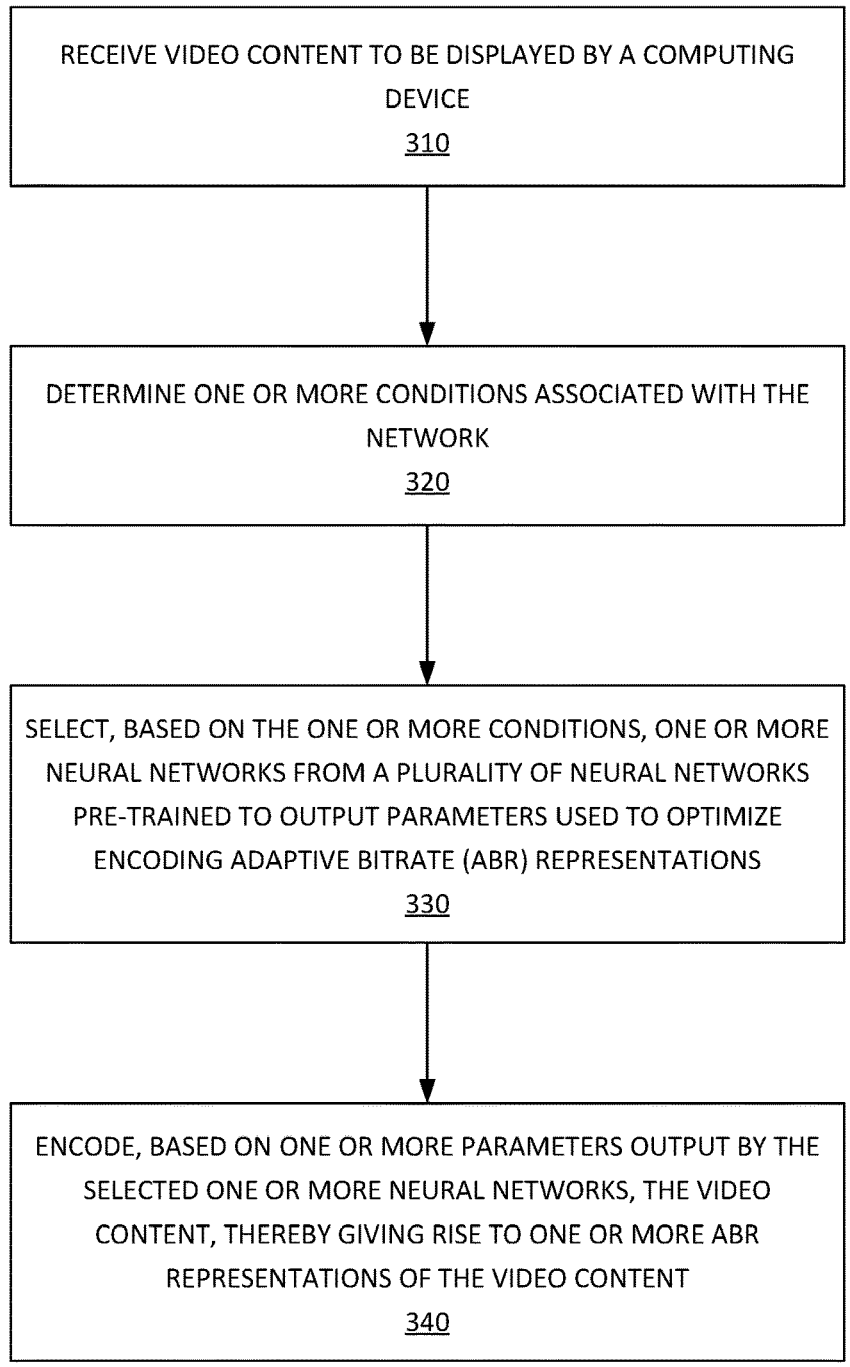
FIG. 3 shows an example method.

FIG. 3 shows an example method 300. The method 300 of FIG. 3, may be performed by any device, for example, by any of the devices depicted in FIGS. 1-2 or described herein. While each step in the method 300 of FIG. 3 is shown and described separately, multiple steps may be executed in a different order than what is shown, in parallel with each other, or concurrently with each other. At step 310, video content to be displayed by a computing device may be received.

At step 320, one or more conditions associated with a network may be determined. The one or more conditions may comprise at least one of: available bandwidth, QoS, latency, packet loss ratio, rebuffering time, or QoE.

At step 330, one or more neural networks may be selected from a plurality of neural networks pre-trained to output parameters used to optimize encoding adaptive bitrate (ABR) representations. The selection may be based on the one or more conditions.

Each neural network of the plurality of neural networks may be trained, based on one or more of: content type, compressed video content, uncompressed video content, video content comprising artifacts, temporal and spatial information, edges, corners, textures, pixel luma and chroma values, region of interests, motion or optical flow information, backgrounds, foregrounds, patterns, or spatial low or high frequencies. The video content included in the compressed video content, uncompressed video content, and video content comprising artifacts may comprise any number of sequences of video or images (e.g., tens of video sequences, hundreds of video sequences, thousands of video sequences, millions of video sequences, . . . ) available for training. The video content included in the compressed video content, uncompressed video content, and video content comprising artifacts may comprise any number of sequences of video or images that is available for training may be stored locally at the sender server or in another data source such as a third party database. The artifacts in the video content may comprise any type of artifact such as encoding artifacts, network transmission artifacts, artifacts which are a result of any type of noise such as Gaussian noise, salt-and-pepper noise, shot noise, film grain, quantization noise, etc.

Each neural network of the plurality of neural networks may also be trained based on one or more features extracted from the video content. The extracted features may comprise at least one of: temporal and spatial information, edges, corners, textures, pixel luma and chroma values, region of interests, motion or optical flow information, backgrounds, foregrounds, patterns, or spatial low or high frequencies.

The selection may comprise adjusting the selected one or more neural networks. Adjusting the selected one or more neural networks may, for example, comprise removing one or more neural network layers of the selected one or more neural networks, adjusting one or more weights associated with one or more neurons of the selected one or more neural networks, removing one or more neurons from one or more layers of the selected one or more neural networks, adjusting an activation function associated with the selected one or more neural networks, adjusting a loss function associated with the selected one or more neural networks, adding neural network layers of the selected one or more neural networks, or adjusting a structure or one or more hyperparameters of the selected one or more neural networks.

At step 340, the video content may be encoded, based on one or more parameters output by the selected one or more neural networks, thereby giving rise to one or more ABR representations of the video content. The one or more parameters may comprise one or more parameters for encoding each segment of each ABR representation of the plurality of ABR representations. The encoding may also be based on data associated with the content, wherein the data comprises at least one of: a target bitrate, a content type, visual quality of the video content, a resolution, or a frame rate. The data may be received from the content origin or determine by the system.

The one or more ABR representations output using these techniques may maximize perceptual visual quality of the video content, maintain a substantially constant perceptual visual quality of the video content, or minimize latency associated with playback of the video content. The substantially constant perceptual visual quality may be indicated by at least one of: PSNR, MS-SSIM, or VMAF. The minimized latency associated with playback of the content may cause minimizing rebuffering at the computing device. These steps may be repeated when a change is determined for the one or more network conditions.

Figure 4:
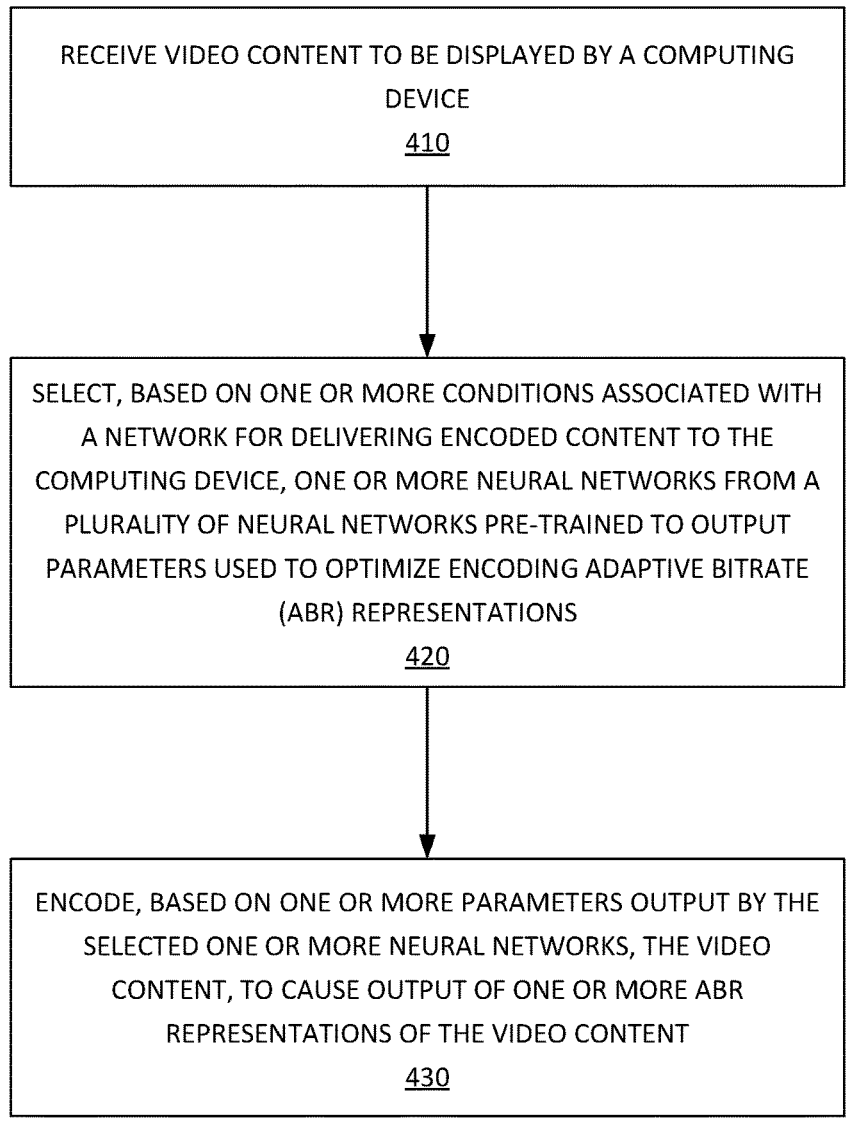
FIG. 4 shows an example method.

FIG. 4 shows an example method 400. The method 400 of FIG. 4, may be performed by any device, for example, by any of the devices depicted in FIGS. 1-2 or described herein. While each step in the method 400 of FIG. 4 is shown and described separately, multiple steps may be executed in a different order than what is shown, in parallel with each other, or concurrently with each other. At step 410, video content to be displayed by a computing device may be received.

At step 420, one or more neural networks may be selected from a plurality of neural networks pre-trained to output parameters used to optimize encoding adaptive bitrate (ABR) representations. The selection may be based on one or more conditions associated with a network used to deliver encoded content to the computing device. The one or more conditions may comprise at least one of: available bandwidth, QoS, latency, packet loss ratio, rebuffering time, or QoE.

Each neural network of the plurality of neural networks may be trained, based on one or more of: content type, compressed video content, uncompressed video content, video content comprising artifacts, temporal and spatial information, edges, corners, textures, pixel luma and chroma values, region of interests, motion or optical flow information, backgrounds, foregrounds, patterns, or spatial low or high frequencies. The video content included in the compressed video content, uncompressed video content, and video content comprising artifacts may comprise any number of sequences of video or images (e.g., tens of video sequences, hundreds of video sequences, thousands of video sequences, millions of video sequences, . . . ) available for training. The video content included in the compressed video content, uncompressed video content, and video content comprising artifacts may comprise any number of sequences of video or images that is available for training may be stored locally at the sender server or in another data source such as a third party database. The artifacts in the video content may comprise any type of artifact such as encoding artifacts, network transmission artifacts, artifacts which are a result of any type of noise such as Gaussian noise, salt-and-pepper noise, shot noise, film grain, quantization noise, etc.

Each neural network of the plurality of neural networks may also be trained based on one or more features extracted from the video content. The extracted features may comprise at least one of: temporal and spatial information, edges, corners, textures, pixel luma and chroma values, region of interests, motion or optical flow information, backgrounds, foregrounds, patterns, or spatial low or high frequencies.

The selection may comprise adjusting the selected one or more neural networks. Adjusting the selected one or more neural networks may, for example, comprise removing one or more neural network layers of the selected one or more neural networks, adjusting one or more weights associated with one or more neurons of the selected one or more neural networks, removing one or more neurons from one or more layers of the selected one or more neural networks, adjusting an activation function associated with the selected one or more neural networks, adjusting a loss function associated with the selected one or more neural networks, adding neural network layers of the selected one or more neural networks, or adjusting a structure or one or more hyperparameters of the selected one or more neural networks.

At step 430, the video content may be encoded, based on one or more parameters output by the selected one or more neural networks, to cause output of one or more ABR representations of the video content. The one or more parameters may comprise one or more parameters for encoding each segment of each ABR representation of the plurality of ABR representations. The encoding may also be based on data associated with the content, wherein the data comprises at least one of: a target bitrate, a content type, visual quality of the video content, a resolution, or a frame rate. The data may be received from the content origin or determine by the system.

The one or more ABR representations output using these techniques may maximize perceptual visual quality of the video content, maintain a substantially constant perceptual visual quality of the video content, or minimize latency associated with playback of the video content. The substantially constant perceptual visual quality may be indicated by at least one of: PSNR, MS-SSIM, or VMAF. The minimized latency associated with playback of the content may cause minimizing rebuffering at the computing device. These steps may be repeated when a change is determined for the one or more network conditions.

Figure 5:
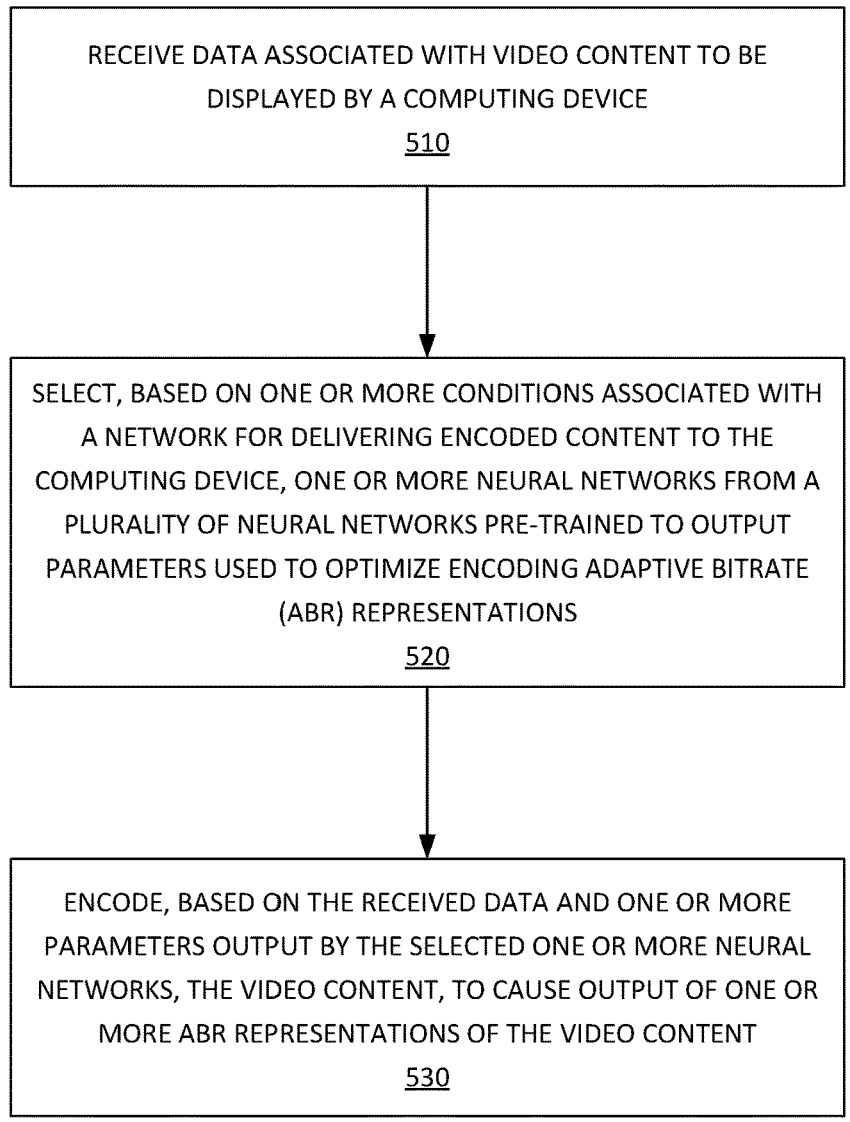
FIG. 5 shows an example method.

FIG. 5 shows an example method 500. The method 500 of FIG. 5, may be performed by any device, for example, by any of the devices depicted in FIGS. 1-2 or described herein. While each step in the method 500 of FIG. 5 is shown and described separately, multiple steps may be executed in a different order than what is shown, in parallel with each other, or concurrently with each other. At step 510, data associated with video content to be displayed by a computing device may be received.

At step 520, one or more neural networks may be selected from a plurality of neural networks pre-trained to output parameters used to optimize encoding adaptive bitrate (ABR) representations. The selection may be based on one or more conditions associated with a network used to deliver encoded content to the computing device. The one or more conditions may comprise at least one of: available bandwidth, QoS, latency, packet loss ratio, rebuffering time, or QoE.

Each neural network of the plurality of neural networks may be trained, based on one or more of: content type, compressed video content, uncompressed video content, video content comprising artifacts, temporal and spatial information, edges, corners, textures, pixel luma and chroma values, region of interests, motion or optical flow information, backgrounds, foregrounds, patterns, or spatial low or high frequencies. The video content included in the compressed video content, uncompressed video content, and video content comprising artifacts may comprise any number of sequences of video or images (e.g., tens of video sequences, hundreds of video sequences, thousands of video sequences, millions of video sequences, . . . ) available for training. The video content included in the compressed video content, uncompressed video content, and video content comprising artifacts may comprise any number of sequences of video or images that is available for training may be stored locally at the sender server or in another data source such as a third party database. The artifacts in the video content may comprise any type of artifact such as encoding artifacts, network transmission artifacts, artifacts which are a result of any type of noise such as Gaussian noise, salt-and-pepper noise, shot noise, film grain, quantization noise, etc.

Each neural network of the plurality of neural networks may also be trained based on one or more features extracted from the video content. The extracted features may comprise at least one of: temporal and spatial information, edges, corners, textures, pixel luma and chroma values, region of interests, motion or optical flow information, backgrounds, foregrounds, patterns, or spatial low or high frequencies.

The selection may comprise adjusting the selected one or more neural networks. Adjusting the selected one or more neural networks may, for example, comprise removing one or more neural network layers of the selected one or more neural networks, adjusting one or more weights associated with one or more neurons of the selected one or more neural networks, removing one or more neurons from one or more layers of the selected one or more neural networks, adjusting an activation function associated with the selected one or more neural networks, adjusting a loss function associated with the selected one or more neural networks, adding neural network layers of the selected one or more neural networks, or adjusting a structure or one or more hyperparameters of the selected one or more neural networks.

At step 530, the video content may be encoded, based on the received data and one or more parameters output by the selected one or more neural networks, to cause output of one or more ABR representations of the video content. The one or more parameters may comprise one or more parameters for encoding each segment of each ABR representation of the plurality of ABR representations. The received data may comprise at least one of: a target bitrate, a content type, visual quality of the video content, a resolution, or a frame rate. The data may be received from the content origin or determine by the system.

The one or more ABR representations output using these techniques may maximize perceptual visual quality of the video content, maintain a substantially constant perceptual visual quality of the video content, or minimize latency associated with playback of the video content. The substantially constant perceptual visual quality may be indicated by at least one of: PSNR, MS-SSIM, or VMAF. The minimized latency associated with playback of the content may cause minimizing rebuffering at the computing device. These steps may be repeated when a change is determined for the one or more network conditions.

Figure 6:
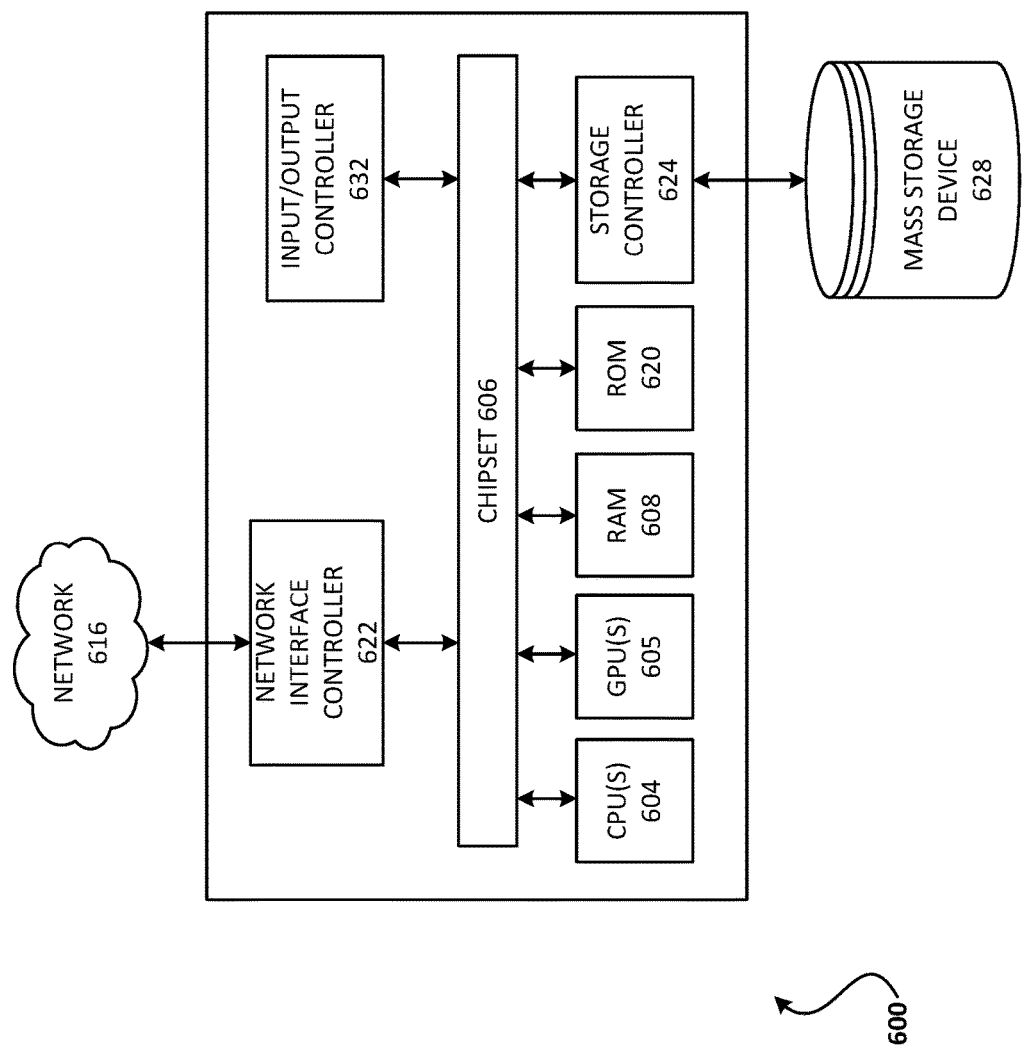
FIG. 6 shows an example computing device.

FIG. 6 depicts a computing device that may be used in various aspects, such as the servers, modules, and/or devices depicted in FIGS. 1-2. With regard to the example architecture of FIGS. 1-2, each device depicted in FIGS. 1-2 may be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-5.

The computing device 600 may comprise a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 1-7.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A non-transitory computer-readable medium storing instructions that, when executed, cause:
   receiving video content to be displayed by a computing device;
   determining one or more conditions associated with a network;
   selecting, based on the one or more conditions, one or more neural networks from a plurality of neural networks pre-trained to output parameters used to optimize encoding adaptive bitrate (ABR) representations; and
   encoding, based on one or more parameters output by the selected one or more neural networks, the video content, to generate one or more ABR representations of the video content.

2. The non-transitory computer-readable medium of claim 1, wherein the selecting comprises adjusting the selected one or more neural networks, wherein the adjustment comprises one or more of:
removing one or more neural network layers of the selected one or more neural networks,
adjusting one or more weights associated with one or more neurons of the selected one or more neural networks,
removing one or more neurons from one or more layers of the selected one or more neural networks,
adding one or more neurons to one or more neural network layers of the selected one or more neural networks,
adjusting an activation function associated with the selected one or more neural networks,
adjusting a loss function associated with the selected one or more neural networks, or
adding one or more neural network layers to the selected one or more neural networks.

3. The non-transitory computer-readable medium of claim 1, wherein the selecting comprises adjusting a structure or one or more hyperparameters of the selected one or more neural networks.

4. The non-transitory computer-readable medium of claim 1, wherein the one or more parameters comprise one or more parameters for encoding each segment of each ABR representation of the one or more ABR representations.

5. The non-transitory computer-readable medium of claim 1, wherein the instructions, when executed, further cause:
receiving data associated with the video content, wherein the data comprises at least one of: a target bitrate, a content type, visual quality of the video content, a resolution, or a frame rate.

6. The non-transitory computer-readable medium of claim 1, wherein the instructions, when executed, further cause:
extracting, from the video content, one or more features associated with the video content.

7. The non-transitory computer-readable medium of claim 6, wherein the extracted one or more features comprise at least one of: temporal and spatial information, edges, corners, textures, pixel luma and chroma values, region of interests, motion or optical flow information, backgrounds, foregrounds, patterns, or spatial low or high frequencies.

8. The non-transitory computer-readable medium of claim 1, wherein the one or more conditions comprise at least one of: available bandwidth, quality of service (QOS), latency, packet loss ratio, rebuffering time, or quality of experience (QoE).

9. The non-transitory computer-readable medium of claim 1, wherein the one or more parameters achieve at least one of:
maximizing perceptual visual quality of the video content,
maintaining a substantially constant perceptual visual quality of the video content, or
minimizing latency associated with playback of the video content.

10. The non-transitory computer-readable medium of claim 9, wherein the substantially constant perceptual visual quality is indicated by at least one of: peak signal-to-noise ratio (PSNR), multiscale structural similarity index measure (MS-SSIM), or video multimethod assessment fusion (VMAF).

11. The non-transitory computer-readable medium of claim 9, wherein the minimized latency associated with playback of the video content causes minimizing rebuffering at the computing device.

12. The non-transitory computer-readable medium of claim 1, wherein each neural network of the plurality of neural networks is trained, based on one or more of:
content type, compressed video content, uncompressed video content, video content comprising artifacts, temporal and spatial information, edges, corners, textures, pixel luma and chroma values, region of interests, motion or optical flow information, backgrounds, foregrounds, patterns, or spatial low or high frequencies.

13. The non-transitory computer-readable medium of claim 1, wherein the instructions, when executed, further cause:
determining a change to the one or more conditions associated with the network; and
based on the determined change, repeating:
the selecting the one or more neural networks from the plurality of neural networks, and
the encoding the one or more ABR representations of the video content.

14. A system comprising:
a first computing device configured to:
receive video content to be displayed by a second computing device,
determine one or more conditions associated with a network,
select, based on the one or more conditions, one or more neural networks from a plurality of neural networks pre-trained to output parameters used to optimize encoding adaptive bitrate (ABR) representations, and
encode, based on one or more parameters output by the selected one or more neural networks, the video content, to generate one or more ABR representations of the video content; and
the second computing device configured to:
cause display of an ABR representation of the one or more ABR representations of the video content.

15. The system of claim 14, wherein the selecting comprises adjusting the selected one or more neural networks, wherein the adjustment comprises one or more of:
removing one or more neural network layers of the selected one or more neural networks,
adjusting one or more weights associated with one or more neurons of the selected one or more neural networks,
removing one or more neurons from one or more layers of the selected one or more neural networks,
adding one or more neurons to one or more neural network layers of the selected one or more neural networks,
adjusting an activation function associated with the selected one or more neural networks,
adjusting a loss function associated with the selected one or more neural networks, or
adding one or more neural network layers to the selected one or more neural networks.

16. The system of claim 14, wherein the selecting comprises adjusting a structure or one or more hyperparameters of the selected one or more neural networks.

17. The system of claim 14, wherein the one or more parameters comprise one or more parameters for encoding each segment of each ABR representation of the one or more ABR representations.

18. The system of claim 14, wherein the first computing device is further configured to:

receive data associated with the video content, wherein the data comprises at least one of: a target bitrate, a content type, visual quality of the video content, a resolution, or a frame rate.

19. The system of claim 14, wherein the first computing device is further configured to:
extract, from the video content, one or more features associated with the video content.

20. The system of claim 19, wherein the extracted one or more features comprise at least one of: temporal and spatial information, edges, corners, textures, pixel luma and chroma values, region of interests, motion or optical flow information, backgrounds, foregrounds, patterns, or spatial low or high frequencies.

21. The system of claim 14, wherein the one or more conditions comprise at least one of: available bandwidth, quality of service (QOS), latency, packet loss ratio, rebuffering time, or quality of experience (QoE).

22. The system of claim 14, wherein the one or more parameters achieve at least one of:
maximizing perceptual visual quality of the video content,
maintaining a substantially constant perceptual visual quality of the video content, or
minimizing latency associated with playback of the video content.

23. The system of claim 22, wherein the substantially constant perceptual visual quality is indicated by at least one of: peak signal-to-noise ratio (PSNR), multiscale structural similarity index measure (MS-SSIM), or video multimethod assessment fusion (VMAF).

24. The system of claim 22, wherein the minimized latency associated with playback of the video content causes minimizing rebuffering at the second computing device.

25. The system of claim 14, wherein each neural network of the plurality of neural networks is trained, based on one or more of:
content type, compressed video content, uncompressed video content, video content comprising artifacts, temporal and spatial information, edges, corners, textures, pixel luma and chroma values, region of interests, motion or optical flow information, backgrounds, foregrounds, patterns, or spatial low or high frequencies.

26. The system of claim 14, wherein the first computing device is further configured to:
determine a change to the one or more conditions associated with the network; and
based on the determined change, repeat:
the selecting the one or more neural networks from the plurality of neural networks, and
the encoding the one or more ABR representations of the video content.

27. A non-transitory computer-readable medium storing instructions that, when executed, cause:
receiving video content to be displayed by a computing device;
selecting, based on one or more conditions associated with a network for delivering encoded content to the computing device, one or more neural networks from a plurality of neural networks pre-trained to output parameters used to optimize encoding adaptive bitrate (ABR) representations; and
encoding, based on one or more parameters output by the selected one or more neural networks, the video content to cause output of one or more ABR representations of the video content.

28. The non-transitory computer-readable medium of claim 27, wherein the selecting comprises adjusting the selected one or more neural networks, wherein the adjustment comprises one or more of:
removing one or more neural network layers of the selected one or more neural networks,
adjusting one or more weights associated with one or more neurons of the selected one or more neural networks,
removing one or more neurons from one or more layers of the selected one or more neural networks,
adding one or more neurons to one or more neural network layers of the selected one or more neural networks,
adjusting an activation function associated with the selected one or more neural networks,
adjusting a loss function associated with the selected one or more neural networks,
adding one or more neural network layers to the selected one or more neural networks, or
adjusting a structure or one or more hyperparameters of the selected one or more neural networks.

29. The non-transitory computer-readable medium of claim 27, wherein the one or more conditions comprise at least one of: available bandwidth, quality of service (QOS), latency, packet loss ratio, rebuffering time, or quality of experience (QoE).

30. The non-transitory computer-readable medium of claim 27, wherein the instructions, when executed, further cause:
receiving data associated with the content, wherein the data comprises at least one of: a target bitrate, a content type, visual quality of the video content, a resolution, or a frame rate.

31. The non-transitory computer-readable medium of claim 27, wherein the one or more parameters achieve at least one of:
maximizing perceptual visual quality of the video content,
maintaining a substantially constant perceptual visual quality of the video content, or
minimizing latency associated with playback of the video content.

32. A system comprising:
a first computing device configured to:
receive video content to be displayed by a second computing device;
select, based on one or more conditions associated with a network for delivering encoded content to the computing device, one or more neural networks from a plurality of neural networks pre-trained to output parameters used to optimize encoding adaptive bitrate (ABR) representations; and
encode, based on one or more parameters output by the selected one or more neural networks, the video content to cause output of one or more ABR representations of the video content; and
the second computing device configured to:
cause display of an ABR representation of the one or more ABR representations of the video content.

33. The system of claim 32, wherein the selecting comprises adjusting the selected one or more neural networks, wherein the adjustment comprises one or more of:
removing one or more neural network layers of the selected one or more neural networks,
adjusting one or more weights associated with one or more neurons of the selected one or more neural networks,
removing one or more neurons from one or more layers of the selected one or more neural networks, adding one or more neurons to one or more neural network layers of the selected one or more neural networks, adjusting an activation function associated with the selected one or more neural networks, adjusting a loss function associated with the selected one or more neural networks, adding one or more neural network layers to the selected one or more neural networks, or adjusting a structure or one or more hyperparameters of the selected one or more neural networks.

34. The system of claim 32, wherein the one or more conditions comprise at least one of: available bandwidth, quality of service (QOS), latency, packet loss ratio, rebuffering time, or quality of experience (QoE).

35. The system of claim 32, wherein the first computing device is further configured to:

receive data associated with the content, wherein the data comprises at least one of: a target bitrate, a content type, visual quality of the video content, a resolution, or a frame rate.

36. The system of claim 32, wherein the one or more parameters achieve at least one of:

maximizing perceptual visual quality of the video content, maintaining a substantially constant perceptual visual quality of the video content, or minimizing latency associated with playback of the video content.

\* \* \* \* \*